United States Patent [19]
Anderson et al.

[11] 3,793,887
[45] Feb. 26, 1974

[54] ISOKINETIC SAMPLING PROBE

[75] Inventors: Richard D. Anderson, Southgate; Nicolas A. Azelborn, Ypsilanti; Wallace R. Wade, Farmington, all of Mich.

[73] Assignee: Ford Motor Company, Dearborn, Mich.

[22] Filed: Dec. 5, 1972

[21] Appl. No.: 312,419

[52] U.S. Cl. .......................................... 73/421.5 R
[51] Int. Cl. .............................................. G01r 1/24
[58] Field of Search ..... 73/421.5 R, 421.5 A, 422 R

[56] References Cited
UNITED STATES PATENTS

| | | |
|---|---|---|
| 3,461,727 | 8/1969 | Everhard et al. ............... 73/421.5 R |
| 3,593,023 | 7/1971 | Dodson et al. .................. 73/421.5 R |
| 3,603,155 | 9/1971 | Morris et al. ................... 73/421.5 R |
| 3,611,812 | 10/1971 | Cleveland ....................... 73/421.5 R |
| 3,699,814 | 10/1972 | Kaufman ......................... 73/421.5 R |

*Primary Examiner*—S. Clement Swisher
*Attorney, Agent, or Firm*—Keith L. Zerschling; Joseph W. Malleck

[57] ABSTRACT

A sampling and handling system for the exhaust of an automotive engine whereby emissions flowing through a through-duct are mixed, extracted through an isokinetic probe, and maintained heated until analysis of the sampled gases is completed. A variable speed pump means is utilized to equalize the instantaneous pressure drop through the probe with the instantaneous pressure drop through the exhaust duct.

10 Claims, 1 Drawing Figure

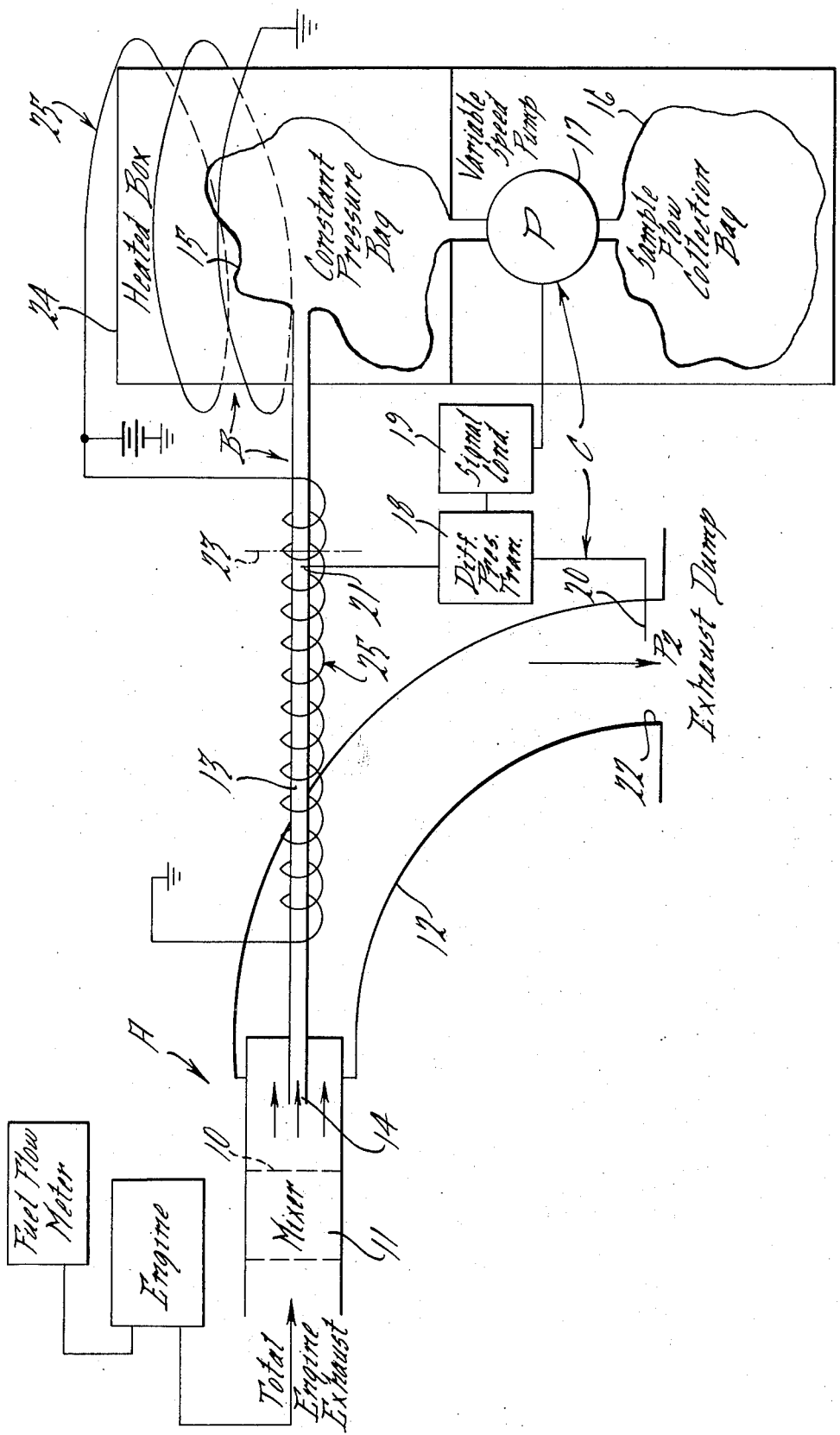

ISOKINETIC SAMPLING PROBE

BACKGROUND OF THE INVENTION

The Federal Government recently has enacted standards for the measurement of emissions from automotive engines based upon a constant volume system and particularly adapted for low mass flow emissions such as that typically emitted by an internal combustion engine. Such system is not feasible when working with high mass flow emissions from engines such as a gas turbine. In an effort to make the sampled emissions representative of the actual emissions, sophisticated and complex components, such as heat exchangers, flow measuring devices and special-design fans have all been required and utilized to compensate for variance in pressure, temperature and flow conditions between the sampled gas and the actual emissions. Federal standards have also required that dilution air be introduced to the emission duct to guard against the problem of the premature condensation of certain gaseous elements which will distort the sampling analysis.

SUMMARY OF THE INVENTION

It is the primary object of this invention to provide an apparatus and method for determining the total emission content of engines having both low and high mass flow rates, which apparatus can function without the necessity for use of dilution air and is particularly characterized by simplicity of the handling system and economy of construction.

Another object of the invention is to provide an emission measuring system which is effective to increase accuracy by dealing solely with emissions devoid of air dilution and simply accounts for start-up dilution.

Still another object of this invention is to provide an emission measuring system which can be converted to portable use.

SUMMARY OF THE DRAWING

FIG. 1 is a schematic illustration of one preferred apparatus for carrying out the present invention.

DETAILED DESCRIPTION

A through-flow duct A is adapted to receive the total exhaust emissions from an engine such as gas turbine and has a mixing device 10 effective to homogenize the exhaust emissions. A first straight portion 11 of the through-duct connects with a curvilinear portion 12, the combination is used to facilitate the introduction of an isokinetic probe 13 constituting part of a continuous extracting means B. The probe has a mouth or inlet 14 positioned downstream of the mixing device 10 but slightly upstream of the juncture of portions 11 and 12. The probe has an elastic container 15 (in the form of an expandable bag) together comprise a withdrawal passage for extracting a proportional sample of the exhaust gases and conveying such sampled gases to be eventually conducted to a collection receptacle 16 (also in the form of one or more expandable bags) for eventual concentration analysis.

Means C is employed to obtain an equalization between the pressure passing through the exit of the duct A and a downstream station of said isokinetic probe. Means C may comprise a variable speed pump 17 interposed downstream of said elastic container 15 and within said withdrawal passage; the pump is electrically controlled in response to a differential pressure transducer 18 operating a signal conductor 19; the transducer has sensor 20 disposed in a downstream station of the isokinetic probe and another sensor 21 disposed in the exit portion 22 of the through-flow duct.

Flow rate and thereby pressure conditions of the instantaneous engine emissions vary during a test cycle. Across a theoretical section of the duct A passing through probe mouth 14, the pressures conditions will be the same. However, due to various downstream conditions, the pressure drop at station 23 in the probe will not necessarily be the same as the pressure drop experienced at the exit 22 of the duct A which is freely subject to ambient or atmospheric pressure.

Elastic container 15 is enclosed within a fixed volume enclosure 24 containing ambient or atmospheric pressure acting on the exterior of the elastic container. When container 15 expands to assume the shape of the interior of enclosure 24, pressure within the elastic container will no longer balance the outside pressure at atmospheric, but will begin to increase above ambient. The apparatus is arranged to immediately compensate for such increase to maintain isokinetic pressure conditions within said probe on a continuous basis during a test cycle. To carry out compensation, means C can be of the type which has a transducer 18 to sense a difference in pressure between exit 22 and station 23 (both of which should be maintained at substantially atmospheric pressure) and a converter device 19 effective to translate the pressure differential into a signal for controlling the pump 17.

An alternative means C may comprise a micro-switch mounted on the interior of enclosure 24 which is effective to sense when elastic container assumes the interior shape of the enclosure 24 by bearing against the switch. The switch may in turn allow energization of a constant speed fan to prevent and restore the pressure balance between the interior and exterior of elastic container 15. This embodiment would allow for the elimination of a pressure transducer and variable speed control, but would sacrifice preciseness and smoothness of pressure compensation.

To prevent condensation of the gaseous constituents of emissions, a heating apparatus 25 is employed which may have heating coils surrounding the probe, enclosure 24 and enclosure 24 may extend about receptacle 16 as well as the pump 17 to assist in the prevention of condensation.

A test cycle using this apparatus is continued for a predetermined time period equivalent to certain mileage to be experienced by an automobile; gases within the sealed receptacle are utilized for individual analysis of such elements as CO, $NO_x$ and HC. Typical mechanisms may be utilized to obtain such concentration analysis, such as chemilumenescence for $NO_x$, infrared for CO, and flame ionization for HC.

After the concentration levels have been determined for the sampled gases, the mathematical determination can be made by ratioing the specific measured specie concentration to the total amount of concentrations of carbon bearing specie constituents in the receptacle and then multiplying this ratio by the amount of fuel consumed during such test period to render a final determination in terms of grams per vehicle mile for the specific specie in question.

We claim as our invention:

1. In an apparatus for making a fuel-based determination of the total gaseous constituents emitted from an engine, the combination comprising:
   a. a through-flow duct effective to directly receive the total emissions from said engine and to provide for homogeneous mixing therein,
   b. means effective to isokinetically extract a continuous sample of said homogeneously mixed emissions from said duct,
   c. a receptacle for collecting said sampled gases transmitted by said extracting means,
   d. means for maintaining the temperature of said emissions in the through-flow duct, receptacle, and in said extracting means at an elevated uniform temperature to prevent condensation of said emissions.

2. The combination of claim 1, in which said extracting means has a withdrawal passage and is effective to vary the pressure in said withdrawal passage so as to be substantially equal to the instantaneous pressure at the exit of said through-flow duct.

3. The combination of claim 2, in which means for varying the pressure in said withdrawal passage to obtain equalization to the instantaneous pressure at the exit of said duct comprises an elastic container and a variable speed pump both interposed in said withdrawal passage, said pump being positioned downstream from said elastic container and the flexible container having its exterior subject to ambient pressure, said pump being operated in response to a pressure increase on said flexible container to withdraw emissions from the flexible container into said receptacle and restore equalization of said pressures.

4. The combination as in claim 1, in which there is provided means for measuring the fuel used by said engine whereby a determination of the grams of a gaseous constituent emitted by said engine for a give test cycle may be obtained by measuring the concentration of said gaseous constituent in said receptacle and ratioing this value to the total concentrations of carbon-containing constituents in said receptacle, the ratio then being multiplied by the amount of fuel consumed during the test cycle.

5. The combination as in claim 3, in which said elastic container is enclosed within a fixed volume enclosure, said pressure increase occurring when said elastic container assumes the interior shape of said enclosure.

6. The combination as in claim 3, in which said elastic container is enclosed within a fixed volume enclosure whereby calculation of initial background contamination may be obtained by initiating use of said flexible container in the totally expanded condition occupying substantially the interior volume of said enclosure thereby rendering a known quantity of contamination gases in the apparatus.

7. The combination as in claim 6, in which said apparatus is devoid of dilution air except for that initially entrapped in said probe and flexible container.

8. The combination as in claim 3, in which a control for said extracting means comprises electrical apparatus effective to sense when said flexible container substantially occupies the interior shape of said enclosure for activating operation of said pump to reduce pressure in said flexible container until the latter is spaced from said enclosure.

9. The combination as in claim 7, in which an electrical switch is disposed on an interior wall of said enclosure to be engaged by said flexible container for activating said pump.

10. The combination as in claim 8, in which pressure sensors are disposed at the exit of said through-duct and at a downstream portion of said withdrawal passage, and means for comparing the pressures sensed to operate said pump at a speed in proportion to the degree of pressure differential.

* * * * *